US 7,769,516 B2

(12) United States Patent
Kondo et al.

(10) Patent No.: US 7,769,516 B2
(45) Date of Patent: Aug. 3, 2010

(54) AUTOMATIC GEAR CONTROL DEVICE

(75) Inventors: Takahiro Kondo, Toyota (JP); Makoto Nakayashiki, Nishikamo-gun (JP); Tomohiro Asami, Nisshin (JP); Shun Minaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 622 days.

(21) Appl. No.: 11/661,856

(22) PCT Filed: Mar. 9, 2006

(86) PCT No.: PCT/JP2006/305195

§ 371 (c)(1),
(2), (4) Date: Mar. 5, 2007

(87) PCT Pub. No.: WO2006/095920

PCT Pub. Date: Sep. 14, 2006

(65) Prior Publication Data

US 2008/0172161 A1 Jul. 17, 2008

(30) Foreign Application Priority Data

Mar. 11, 2005 (JP) ............................. 2005-069616

(51) Int. Cl.
*G06F 7/00* (2006.01)
(52) U.S. Cl. .......................................... 701/66; 701/51

(58) Field of Classification Search ................ 477/120, 477/115, 34, 92, 93, 94, 114; 180/54.1, 65.1, 180/65.21, 65.22; 701/1, 22, 51, 66
See application file for complete search history.

(56) References Cited

U.S. PATENT DOCUMENTS

| 4,648,289 | A | * | 3/1987 | Kubo et al. | ................ | 477/93 |
| 4,784,020 | A | * | 11/1988 | Hamano et al. | ................ | 477/93 |
| 6,634,988 | B2 | * | 10/2003 | Shultz et al. | ................ | 477/116 |
| 2002/0117338 | A1 | * | 8/2002 | Itou | ................ | 180/54.1 |

FOREIGN PATENT DOCUMENTS

| JP | 59 137657 | 8/1984 |
| JP | 2000 304125 | 11/2000 |
| JP | 2004 257518 | 9/2004 |
| JP | 2005 3193 | 1/2005 |

* cited by examiner

*Primary Examiner*—Khoi Tran
*Assistant Examiner*—Stephen Holwerda
(74) *Attorney, Agent, or Firm*—Oblon, Spivak, McClelland, Maier & Neustadt, L.L.P.

(57) ABSTRACT

An ECU executes a program including determining whether a mode is a neutral control execution mode, determining whether the mode is a neutral control return mode, detecting a proceeding state of the neutral control return mode when an accelerator is activated during the neutral control return mode, and inhibiting slip start when the mode is in an initial stage of the neutral control return mode.

14 Claims, 9 Drawing Sheets

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |
| N | × | × | × | × | × | × |

○ ENGAGE
× DISENGAGE
◎ OPERATE WHEN ENGINE BRAKE IS EFFECTIVE
△ OPERATE ONLY WHEN DRIVING

AUTOMATIC GEAR CONTROL DEVICE

TECHNICAL FIELD

The present invention relates to a control device for an automatic transmission, and particularly to a control device returning from neutral control to start a vehicle.

BACKGROUND ART

An automatic transmission has been in actual use that has an electromagnetic valve and receives an externally applied electric signal to adjust, by means of an ECU (Electronic Control Unit), such variables concerning gear-ratio change as gear position, hydraulic-pressure level, time constant and timing for example for the gear-ratio change. Using such an ECU, the operating state of the automatic transmission can surely and speedily be changed to various states. Further, the ECU incorporates therein a CPU (Central Processing Unit) and thus can be controlled by a program. Therefore, through changes of the program and various constants, the operating state of the automatic transmission may be set delicately. Then, according to the running state of the vehicle and the load state of the engine, the optimum performance can be derived from the automatic transmission. Here, the running state of the vehicle refers to the vehicle speed, steering operation, the frequency of acceleration/deceleration and the level thereof, and the road surface state for example. The engine load state refers to the rotational speed of the engine, the opening position of the throttle, the press-down degree of the accelerator, the torques of input and output shafts of the engine and automatic transmission for example.

Further, the pressure level of fluid supplied to engagement elements (such as clutch and brake) incorporated in the automatic transmission is delicately adjusted according to the running state of the vehicle and the load state of the engine. By this adjustment, while both of suppression of shift shock and reduction of wear of the engagement elements are achieved, gear ratios can be changed speedily and smoothly.

Such an automatic transmission is configured to connect to an engine via a torque converter or the like and have a transmission mechanism including a plurality of power transmission paths and, for example, automatically change the power transmission paths based on the press-down degree of the accelerator and the vehicle speed. In other words, the automatic transmission is configured to automatically change gear ratios (speed gears). Generally, a vehicle having the automatic transmission is provided with a shift lever to be operated by a driver. According to the operation of the shift lever, the gear position (for example, reverse drive position, neutral position, forward drive position) is set. Within the range of the gear position thus set (usually within the range of the forward drive position), automatic transmission control is performed.

When the vehicle having the automatic transmission as described above is in the condition where the forward drive position is selected while the vehicle stops, a driving force from the engine which is idling is transmitted via the torque converter to the transmission and then transmitted to wheels, resulting in so-called creeping. The creeping is very useful under some predetermined conditions. For example, the vehicle stopping on an uphill slope can be started smoothly. However, when the vehicle should be stopped and kept as it is, the creeping is unnecessary. Thus, the vehicle brake is operated to suppress the creeping force. In other words, the creeping force from the engine is suppressed by the brake, which means that the problem of deterioration in engine fuel economy arises accordingly.

In view of the above, it has been proposed to improve the fuel economy in the following way. In the condition where a forward drive position is selected and the brake pedal is depressed to operate the brake while the accelerator is substantially entirely closed to stop the vehicle, a forward clutch is disengaged while the forward drive position is kept, so that the transmission is in a neutral state which is close to the neutral.

Many techniques have been disclosed including the technique called neutral control as described above as well as a control technique for the state where a vehicle having been stopped is to be started immediately. In particular, a technique is known by which a lockup clutch capable of directly coupling the input and the output of the torque converter is controlled. Specifically, an engaging force of the lockup clutch is fed-back controlled to a predetermined state (slip control) according to a difference between the input pump rotational speed (corresponding to the engine speed) and the output turbine rotational speed. Thus, the slip state of the torque converter is appropriately controlled to prevent vibrations and noise from generating, while improving the starting performance of the vehicle.

Thus, under the sophisticated electronic control, the power transmission ratio between mechanical power transmission by the lockup clutch and power transmission by the torque converter is delicately controlled according to the running state so as to remarkably improve the transmission efficiency. Under this control, an intermediate mode (slip control providing a very small slip to the lockup clutch) is applied extensively to a low-vehicle-speed range so as to expand the lockup region.

Japanese Patent Laying-Open No. 2005-3193 discloses a control apparatus for a lockup clutch of a vehicle, performing slip control for the lockup clutch in returning from neutral control to start the vehicle. The control apparatus for the lockup clutch of the vehicle is a control apparatus for controlling a lockup clutch of a vehicle having a hydraulic power transmission device equipped with the lockup clutch. The hydraulic power transmission device is disposed on the output side of an engine. An automatic transmission is coupled to the output side of the hydraulic power transmission device equipped with the lockup clutch. The control apparatus includes: a neutral control unit releasing a hydraulic frictional engagement device for releasing a power transmission path in the automatic transmission when the vehicle is stopped; an original pressure control unit raising an original pressure of the hydraulic frictional engagement device by a predetermined level during control of the neutral control unit for releasing the power transmission path of the automatic transmission, and gradually reducing the original pressure after the releasing control is finished for returning; and a lockup clutch control unit setting the lockup clutch in a slip state when the vehicle is started. The control hydraulic pressure used for the control of the lockup clutch is produced from the original pressure controlled by the original pressure control unit.

Regarding this control apparatus for the lockup clutch of the vehicle, when the control returns from the neutral control to start the vehicle, the lockup clutch control unit sets the lockup clutch in the slip state. Thus, when the vehicle is to be started, in parallel with transmission of the transmission torque from the engine to the subsequent stage via the hydraulic power transmission device, the transmission torque is also transmitted via the lockup clutch to the subsequent stage. Therefore, as compared with the conventional start with power transmitted by only the hydraulic power transmission device, any increase in rotational speed of the engine when the vehicle is to be started is suppressed. Therefore, good fuel economy is obtained in starting the vehicle (the start of the vehicle as described above is hereinafter referred to as slip start). Further, the original pressure control unit gradually reduces, when the neutral control is finished, the original pressure which is raised by a predetermined pressure during the neutral control by the original pressure control unit. Thus, when the vehicle is to be started immediately after the neutral control, the lockup clutch control unit sets the lockup clutch of the hydraulic power transmission device in the slip state, and a sudden change of the original pressure used for slip control of the lockup clutch can be prevented. Therefore, any disturbance in slip control due to the sudden change of the original pressure is appropriately eliminated.

However, regarding the control apparatus for the lockup clutch of the vehicle as disclosed in Japanese Patent Laying-Open No. 2005-3193, when the accelerator pedal is depressed in returning from the neutral control, the slip start could be done in some cases. In returning from the neutral control, the forward clutch (also referred to as input clutch) having been disengaged is engaged. If the slip start is performed in an initial stage of the forward clutch engagement, the turbine torque would vary to a large extent, resulting in deterioration of the engagement characteristic of the forward clutch. Thus, there arise such problems as occurrence of engagement shock as well as durability.

DISCLOSURE OF THE INVENTION

An object of the present invention is to provide a control device for an automatic transmission, maintaining the durability of an engagement element while suppressing occurrence of engagement shock when the control returns from neutral control.

According to the present invention, a control device for an automatic transmission controls the automatic transmission having an engagement element engaged when a vehicle is started. The automatic transmission includes a torque converter having a lockup clutch and a transmission mechanism. The control device includes: a neutral control execution unit controlling the transmission mechanism to disengage the engagement element in a case where the vehicle in a forward travel position is in a state satisfying a predetermined condition and accordingly stops; a neutral control return unit controlling the transmission mechanism to engage the engagement element in a case where the vehicle is in a state satisfying another predetermined condition; a start control unit controlling the lockup clutch to set the lockup clutch in one of an engaged state and a slip state when the vehicle is started; a detection unit detecting a state of return from the neural control; and a determination unit determining, based on the state of return from the neutral control, whether to control the lockup clutch by the start control unit or not.

In accordance with the present invention, a turbine torque (TT) that is an output torque from the torque converter is represented as described below using an engine torque TE (supposed to be equal to pump torque TP) and a torque ratio t (t>1) of the torque converter. In the case where the lockup clutch is disengaged, the turbine torque is represented as TT=t×TE. In the case where the lockup clutch is not disengaged, using the transmission torque of the lockup clutch indicated by TC, the turbine torque is represented as TT=t×(TE−TC)+TC=t×TE+(1−t)×TC. Therefore, when the slip start is made, turbine torque TT further changes by {(1−t)×TC}. Turbine torque TT is an input torque to the transmission mechanism, and is a torque transmitted to the subsequent stage by a forward clutch that is an engagement element engaged when the vehicle is started and that is disengaged when the neutral control is executed while engaged when the vehicle is started. It is supposed here that this torque changes before the forward clutch is completely engaged. Then, in the case where turbine torque TT changes to a large extent, it is likely that the forward clutch slips and thus wears. In the case where turbine torque TT changes to a small extent, the forward clutch is suddenly engaged to cause shock. Therefore, the detection unit detects a state of return from the neutral control (state of engagement of the forward clutch). When it is determined that the forward clutch is sufficiently engaged, the slip start is allowed. When it is determined that the forward clutch is not sufficiently engaged, the slip start is not allowed. Accordingly, the control device for the automatic transmission can be provided that maintains the durability of the engagement element while suppressing occurrence of engagement shock when the control returns from the neutral control.

Preferably, the determination unit determines to inhibit the control by the start control unit when the return from the neutral control is in an initial state.

In accordance with the present invention, in the case where the return from the neutral control is in an initial state and the forward clutch is not sufficiently engaged, the slip start is inhibited to suppress influences of a change of turbine torque TT on the forward clutch.

Still preferably, the determination unit determines to execute the control by said start control unit when the return from said neutral control has passed through an initial state.

In accordance with the present invention, in the case where the return from the neutral control has passed through the initial state and the forward clutch is sufficiently engaged, the slip start can be permitted to immediately start the vehicle.

Still preferably, the determination unit determines, based on an engagement state of the engagement element, whether the return from the neutral control is in an initial state or has passed through the initial state and determines, when the return from the neutral control has passed through the initial state, to execute control by the start control unit.

In accordance with the present invention, in the case where the forward clutch which is engaged when the vehicle is started is not sufficiently engaged, it is determined that the state is in an initial state. In the case where the forward clutch is sufficiently engaged, it is determined that the state has passed through the initial state. In this way, the slip start can be permitted/inhibited.

Still preferably, the determination unit determines that, when a predetermined time passes from start of the return from the neutral control, the return from the neutral control has passed through the initial state, and determines to execute control by the start control unit.

In accordance with the present invention, when the control returns from the neutral control to engage the forward clutch, a hydraulic pressure is supplied to allow the forward clutch to be engaged. In this response, delay time occurs. Therefore, when a predetermined time has passed from the start of the return from the neutral control, it can be determined that the initial state has passed through.

Still preferably, the determination unit determines that, when a turbine rotational speed is at most a predetermined rotational speed, the initial state has been passed through, and determines to execute control by the start control unit.

In accordance with the present invention, as the control returns from the neutral control and the forward clutch is engaged, turbine rotational speed decreases. Therefore, a change of turbine rotational speed NT from the start of the return from the neutral control is detected. When turbine rotational speed NT becomes a predetermined rotational speed or smaller, it can be determined that the initial state has been passed through.

BEST MODES FOR CARRYING OUT THE INVENTION

Embodiments of the present invention are described hereinafter with reference to the drawings. In the following description, identical components are denoted by identical reference characters. They are designated identically and function identically as well. Therefore, a detailed description of them is not repeated.

First Embodiment

Figure 1:
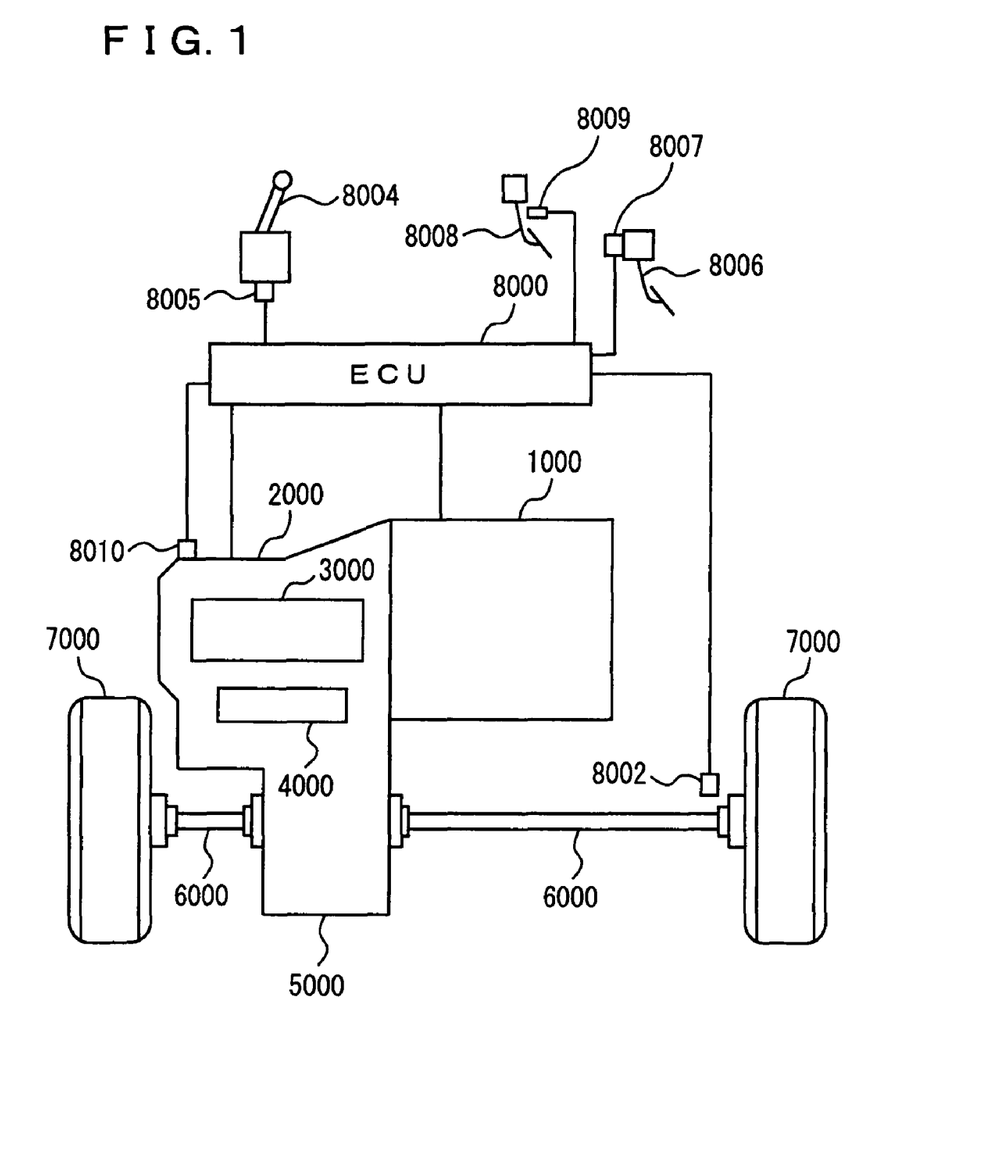
FIG. 1 is a control block diagram showing a vehicle incorporating a control device according to a first embodiment of the present invention.

Referring to FIG. 1, a description is given of a vehicle incorporating a control device for an automatic transmission according to a first embodiment of the present invention. The vehicle is an FF (Front engine Front drive) vehicle. The vehicle incorporating the control device for an automatic transmission according to the present embodiment is not limited to the FF vehicle.

The vehicle includes an engine 1000, a transmission 2000, a planetary gear unit 3000 constituting a portion of transmission 2000, an oil hydraulic circuit 4000 constituting a portion of transmission 2000, a differential gear 5000, a drive shaft 6000, front wheels 7000, and an ECU 8000.

Engine 1000 is an internal combustion engine that burns a mixture of fuel injected from an injector (not shown) and air, within a combustion chamber of a cylinder. A piston in the cylinder is pushed down by the combustion, whereby a crankshaft is rotated. Instead of the internal combustion engine, an external combustion engine may be employed. Further, instead of engine 1000, a rotating electric machine for example may be employed.

Transmission 2000 converts the rotational speed of the crankshaft into a desired rotational speed by implementing a desired gear. The output gear of transmission 2000 meshes with differential gear 5000. As to planetary gear unit 3000, a detailed description thereof is given hereinafter.

Driveshaft 6000 is coupled to differential gear 5000 through spline-fitting for example. Motive power is transmitted to right and left front wheels 7000 via driveshaft 6000.

A vehicle speed sensor 8002, a position switch 8005 of a shift lever 8004, an accelerator pedal position sensor 8007 of an accelerator pedal 8006, a stop lamp switch 8009 provided at a brake pedal 8008, and an oil temperature sensor 8010 are connected to ECU 8000 via a harness or the like.

Vehicle speed sensor 8002 senses the vehicle speed from the rotational speed of drive shaft 6000, and transmits a signal representing the sensed result to ECU 8000. The position of shift lever 8004 is sensed by position switch 8005, and a signal representing the sensed result is transmitted to ECU 8000. A gear of transmission 2000 is automatically implemented corresponding to the position of shift lever 8004. Additionally, the driver may operate to select a manual shift mode in which the driver can select a gear arbitrarily.

Accelerator pedal position sensor 8007 senses the position of accelerator pedal 8006, and transmits a signal representing the sensed result to ECU 8000. Stop lamp switch 8009 senses the ON/OFF state of brake pedal 8008, and transmits a signal representing the sensed result to ECU 8000. A stroke sensor sensing the stroke level of brake pedal 8008 may be provided instead of stop lamp switch 8009. Oil temperature sensor 8010 senses the temperature of ATF (Automatic Transmission Fluid) of transmission 2000, and transmits a signal representing the sensed result to ECU 8000.

ECU 8000 controls various devices such that the vehicle attains a desired traveling state based on signals transmitted from vehicle speed sensor 8002, position switch 8005, accelerator pedal position sensor 8007, stop lamp switch 8009, oil temperature sensor 8010, as well as a map and a program stored in a ROM (Read Only Memory).

Figure 2:
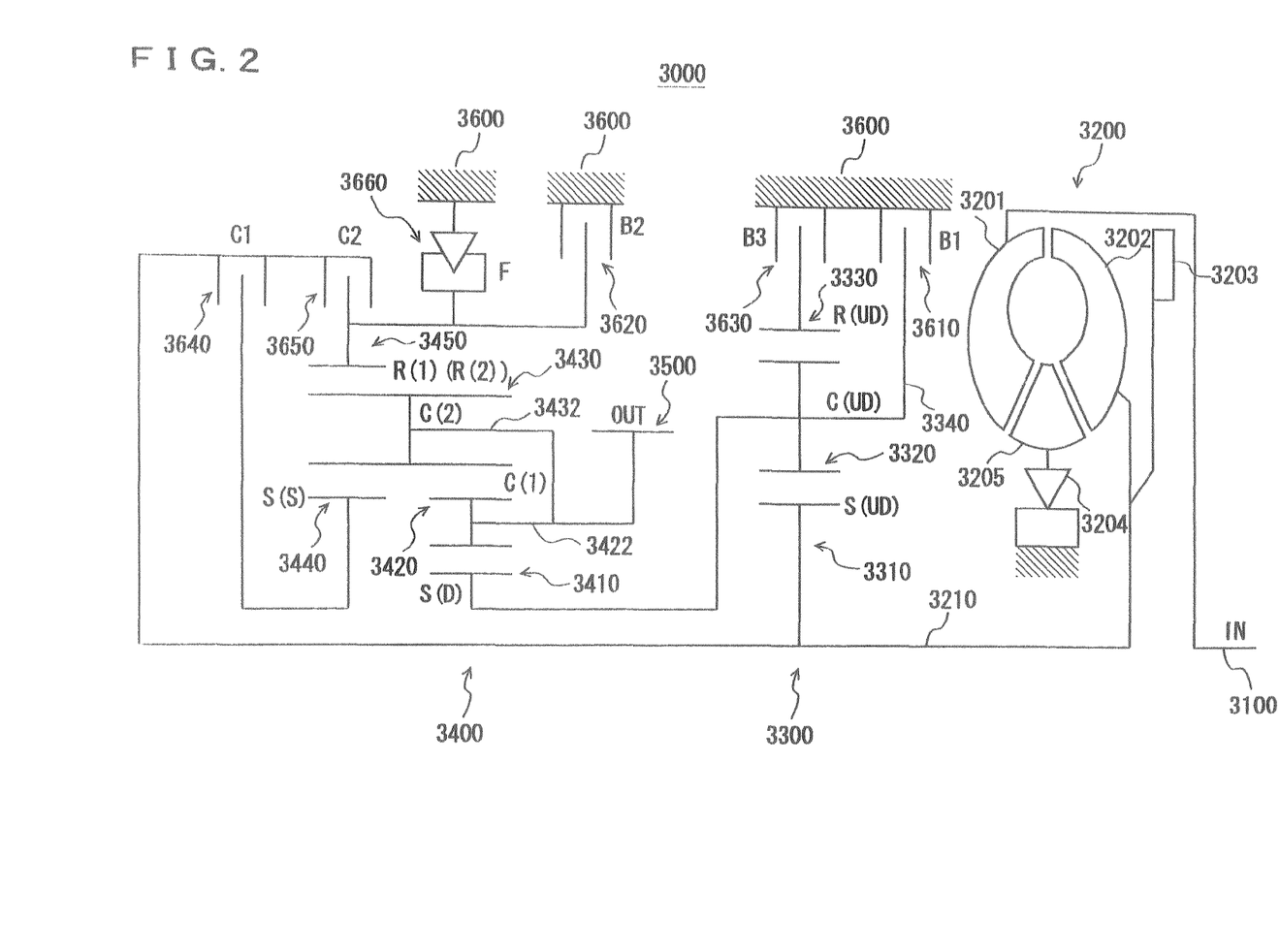
FIG. 2 is a skeleton diagram showing a planetary gear unit.

Referring to FIG. 2, planetary gear unit 3000 is described. Planetary gear unit 3000 is connected to a torque converter 3200 having an input shaft 3100 coupled to the crankshaft. Planetary gear unit 3000 includes a first set of the planetary gear mechanism 3300, a second set of the planetary gear mechanism 3400, an output gear 3500, B1, B2, and B3 brakes 3610, 3620 and 3630 fixed to a gear case 3600, C1 and C2 clutches 3640 and 3650, and a one-way clutch F 3660.

First set 3300 is a single pinion type planetary gear mechanism. First set 3300 includes a sun gear S (UD) 3310, a pinion gear 3320, a ring gear R (UD) 3330, and a carrier C (UD) 3340.

Sun gear S (UD) 3310 is coupled to an output shaft 3210 of torque converter 3200. Pinion gear 3320 is rotatably supported on carrier C (UD) 3340. Pinion gear 3320 engages with sun gear S (UD) 3310 and ring gear R (UD) 3300.

Ring gear R (UD) 3330 is fixed to gear case 3600 by B3 brake 3630. Carrier C (UD) 3340 is fixed to gear case 3600 by B1 brake 3610.

Second set 3400 is a Ravigneaux type planetary gear mechanism. Second set 3400 includes a sun gear S (D) 3410, a short pinion gear 3420, a carrier C (1) 3422, a long pinion gear 3430, a carrier C (2) 3432, a sun gear S (S) 3440, and a ring gear R (1) (R (2)) 3450.

Sun gear S (D) 3410 is coupled to carrier C (UD) 3340. Short pinion gear 3420 is rotatably supported on carrier C (1) 3422. Short pinion gear 3420 engages with sun gear S (D) 3410 and long pinion gear 3430. Carrier C (1) 3422 is coupled with output gear 3500.

Long pinion gear 3430 is rotatably supported on carrier C (2) 3432. Long pinion gear 3430 engages with short pinion gear 3420, sun gear S (S) 3440, and ring gear R (l) (R (2)) 3450. Carrier C (2) 3432 is coupled with output gear 3500.

Sun gear S (S) 3440 is coupled to output shaft 3210 of torque converter 3200 by C1 clutch 3640. Ring gear R (1) (R (2)) 3450 is fixed to gear case 3600 by B2 brake 3620, and coupled to output shaft 3210 of torque converter 3200 by C2 clutch 3650. Ring gear R (1) (R (2)) 3450 is coupled to one-way clutch F 3660, and is disabled in rotation during the drive in first gear.

Figure 3:
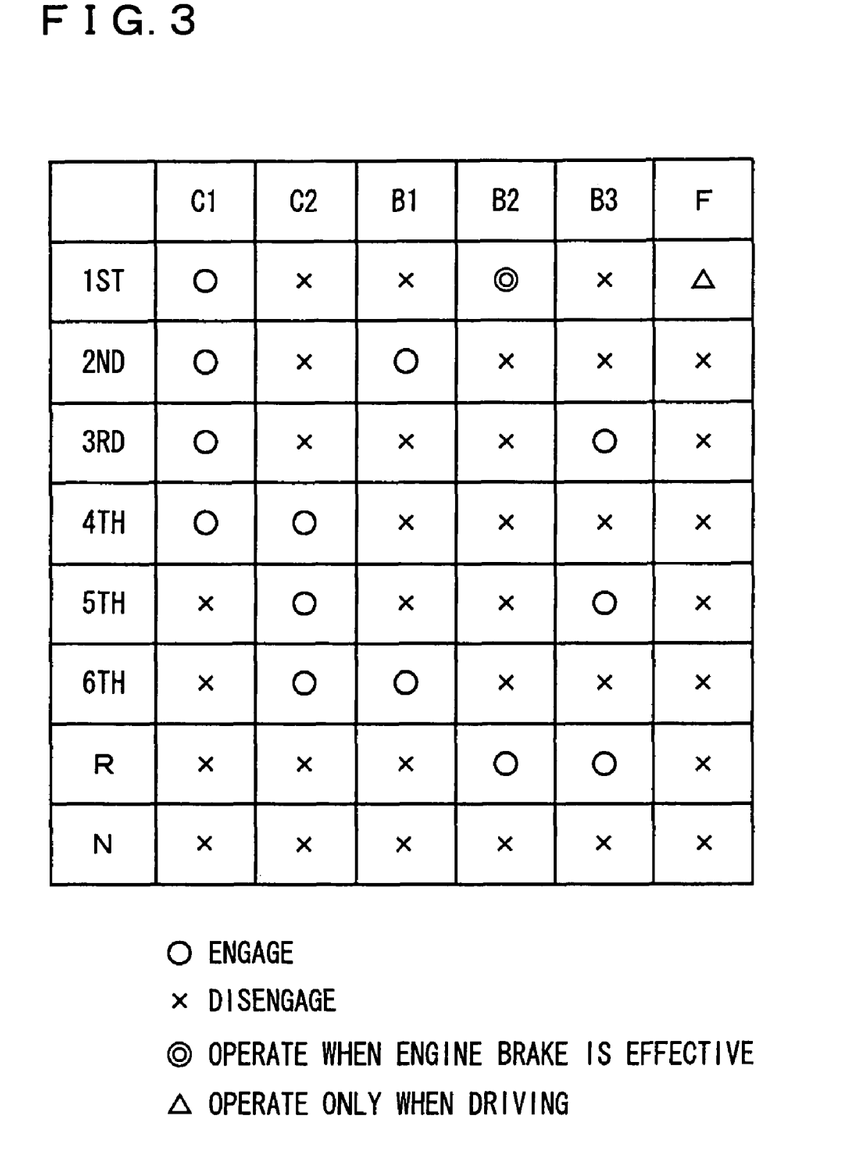
FIG. 3 shows an operation table showing the relation between each gear and brakes and clutches each.

FIG. 3 is an operation table showing the relation between each transmission gear and respective operation states of the clutches and brakes. The mark representing a circle means engagement. The mark representing letter X means disengagement. The mark representing a double circle means engagement in engine braking condition only. The mark representing a triangle means engagement in driving only. According to the combinations shown in this operation table, the brakes and clutches are each operated to implement forward gears including first gear to sixth gear and a reverse gear.

Since one-way clutch F 3660 is provided in parallel with B2 brake 3620, it is not necessary to engage B2 brake 3620 in a driving state from the engine side (acceleration) during implementation of first gear (1ST), as indicated by the double circle mark in the operation table. In the present embodiment, during the drive in first gear, one-way clutch F 3660 restrains the rotation of ring gear R (1) (R (2)) 3450. When engine brake is effected, one-way clutch F 3660 does not restrain the rotation of ring gear R (1) (R (2)) 3450.

Torque converter 3200 has a lockup clutch 3203 directly coupling the input shaft and the output shaft, a pump impeller 3201 on the input-shaft side, a turbine impeller 3202 on the output-shaft side, and a stator 3205 having a one-way clutch 3204 and having torque amplifying capability. Torque converter 3200 and the automatic transmission are connected by a rotational shaft. The rotational speed NT of the output shaft of torque converter 3200 (turbine rotational speed NT) is detected by a turbine rotational speed sensor. The output-shaft rotational speed NOUT of the automatic transmission is detected by an output-shaft rotational speed sensor.

The operation table in FIG. 3 shows the gear for which the clutch elements that are frictional elements (C1-C2 in the table), the brake elements (B1-B3) and the one-way clutch element (F) are engaged/disengaged. In first gear used when the vehicle is started, the clutch element (C1) and the one-way clutch element (F) are engaged. Of these clutch elements, C1 clutch 3640 is particularly referred to as forward travel clutch, input clutch or forward clutch, and is always used in the engaged state for implementing a gear except for the parking (P) position, the reverse (R) position and the neutral (N) position, so as to allow the vehicle to travel forward, as shown the operation table in FIG. 3.

In forward drive (D) position, when it is determined that the vehicle state satisfies predetermined conditions (accelerator-off, brake-on, the brake master cylinder pressure of at least a predetermined value, and the vehicle speed of at most a predetermined value) and thus determined that the vehicle is stopped, C1 clutch 3640 is disengaged to set a predetermined slip state and thereby set a state which is close to the neutral. This control is referred to as neutral control.

ECU 8000 according to the present embodiment sets, in returning from the neutral control, lockup clutch 3206 of torque converter 3200 in the slip state to make the slip start. A feature of the ECU is to inhibit the slip start until C1 clutch 3640 is engaged. In the following, this feature is described using a flowchart.

Figure 4:
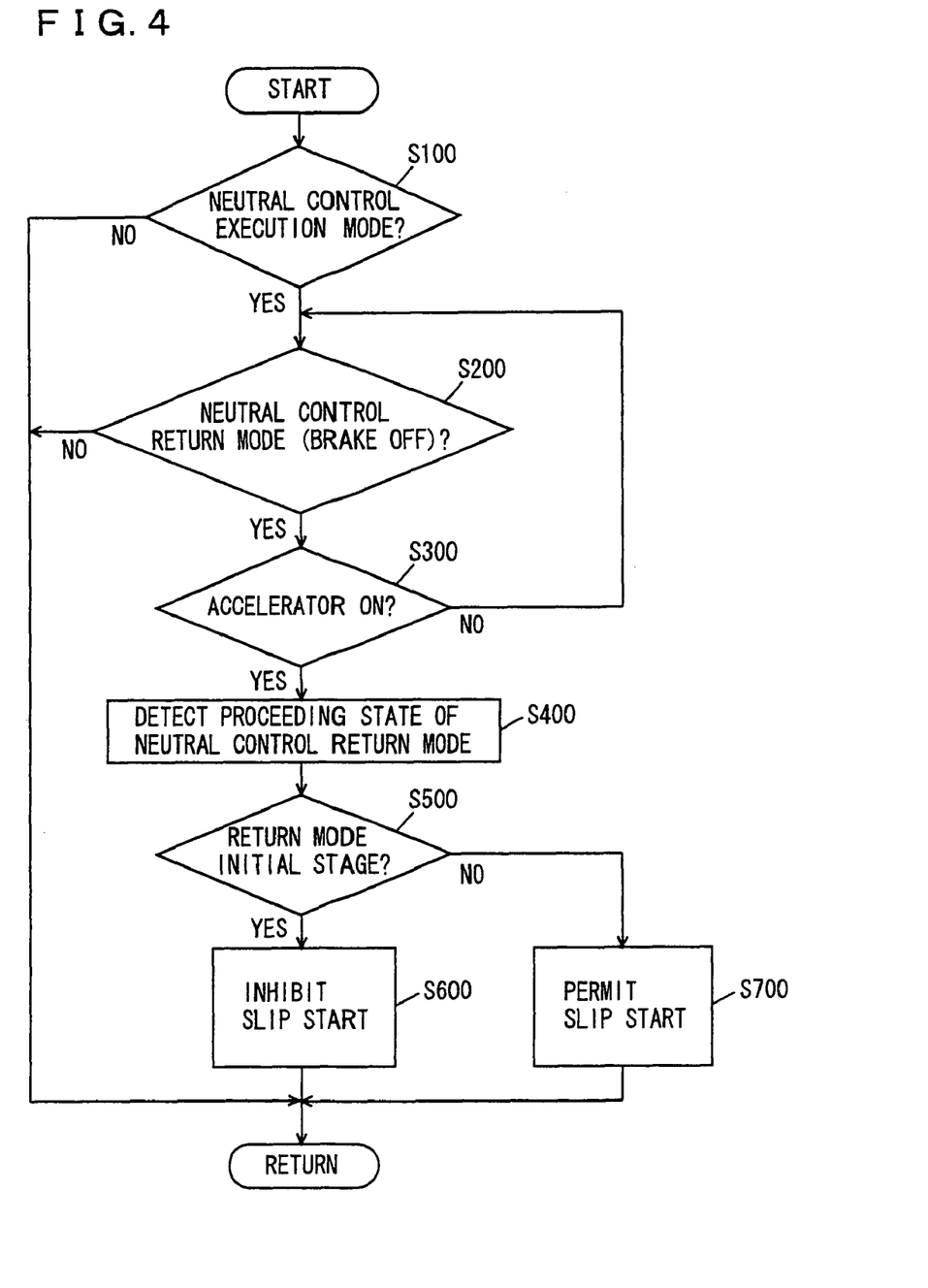
FIG. 4 is a flowchart showing a control structure of a program executed by an ECU that is the control device according to the first embodiment of the present invention.

Referring to FIG. 4, a description is given of a control structure of a program executed by ECU 8000 that is the control device of the present embodiment. Here, the program shown by the flowchart described below is repeatedly executed at a predetermined cycle time.

In step (hereinafter step is abbreviated as S) 100, ECU 8000 determines whether or not the mode is a neutral control execution mode. When such conditions as: the vehicle is stopped; the accelerator pedal is not depressed; and the brake is operating, are satisfied, the neutral control execution mode is started to disengage C1 clutch 3640. When the mode is the neutral control execution mode (YES in S100), the process proceeds to S200. Otherwise (NO in S100), this process is ended.

In S200, ECU 8000 determines whether or not the mode is a neutral control return mode. When such conditions that the vehicle is stopped while the brake is not operating (the depressed brake pedal is not depressed now) are satisfied, the neutral control return mode is started to start to engage C1 clutch 3640. When the mode is the neutral control return mode (YES in S200), the process proceeds to S300. Otherwise (NO in S200), the process is ended.

In S300, ECU 8000 determines whether or not the mode is now the neutral control return mode and the accelerator pedal is depressed to make the accelerator ON. When it is determined that the accelerator is ON (YES in S300), the process proceeds to S400. Otherwise (NO in S300), the process returns to S200.

In S400, ECU 8000 detects the proceeding state of the neutral control return mode. It is detected to what degree C1 clutch 3640 that was disengaged is now engaged. In the present embodiment, the method of this detection is not limited to a particular one.

In S500, ECU 8000 determines whether or not the mode is an initial stage of the neutral control return mode. When it is determined that the mode is now in the initial stage of the neutral control return mode (YES in S500), the process proceeds to S600. Otherwise (NO in S500), the process proceeds to S700.

Figure 5:
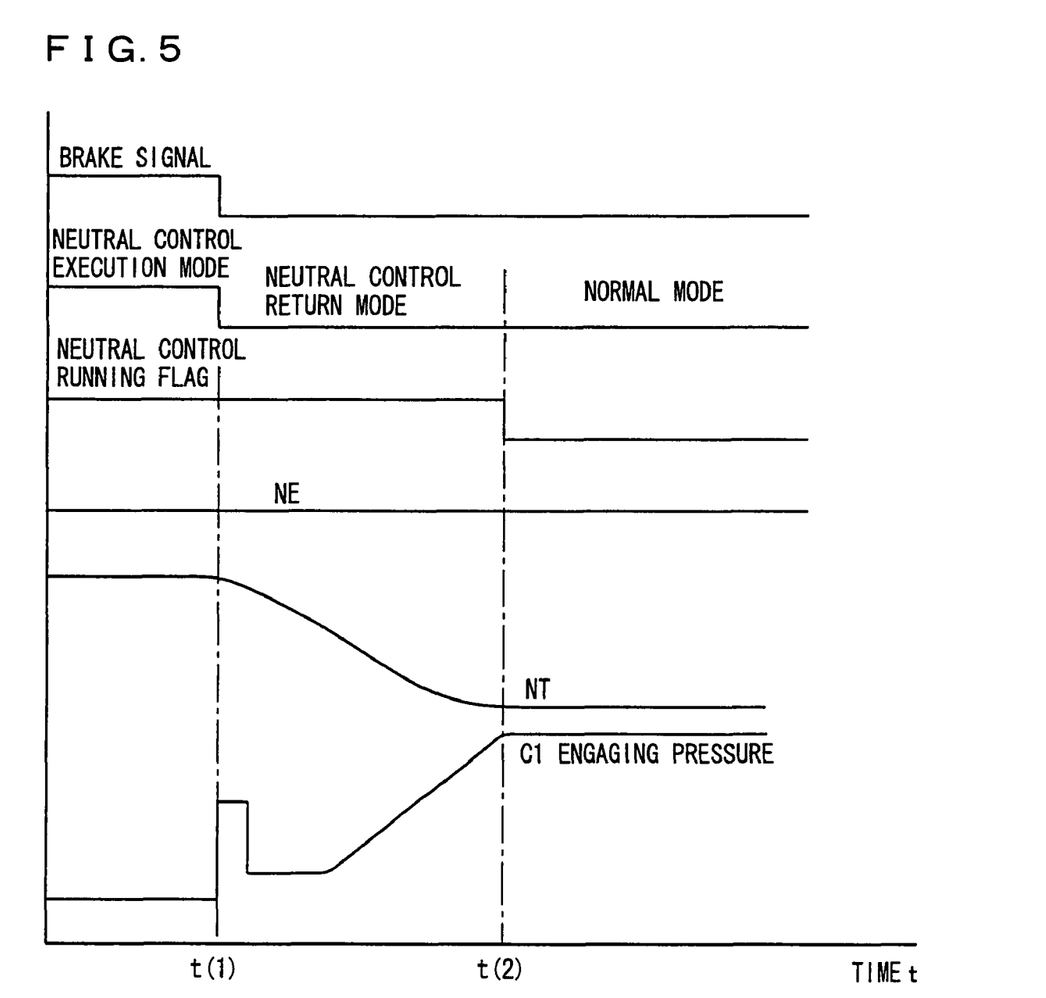
FIG. 5 shows a timing chart (1) of respective levels of states in the case of execution by the ECU that is the control device according to the first embodiment of the present invention.
Figure 6:
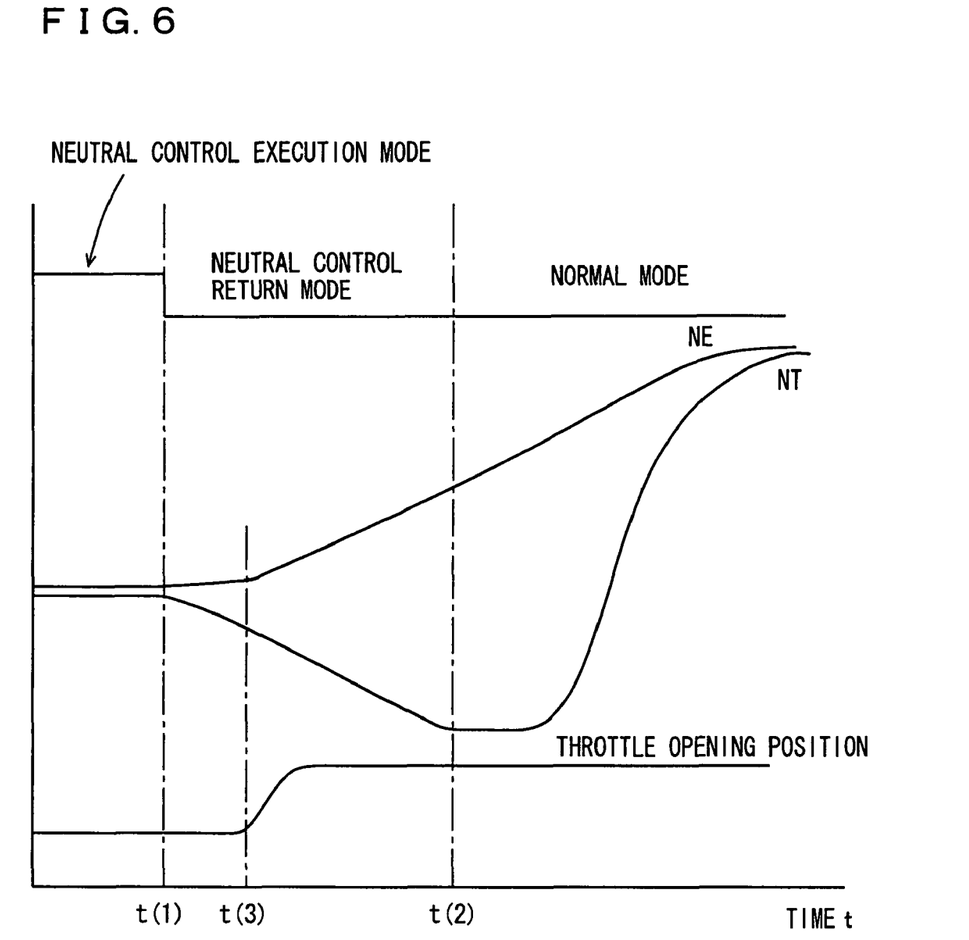
FIG. 6 shows a timing chart (2) of respective levels of states in the case of execution by the ECU that is the control device according to the first embodiment of the present invention.
Figure 7:
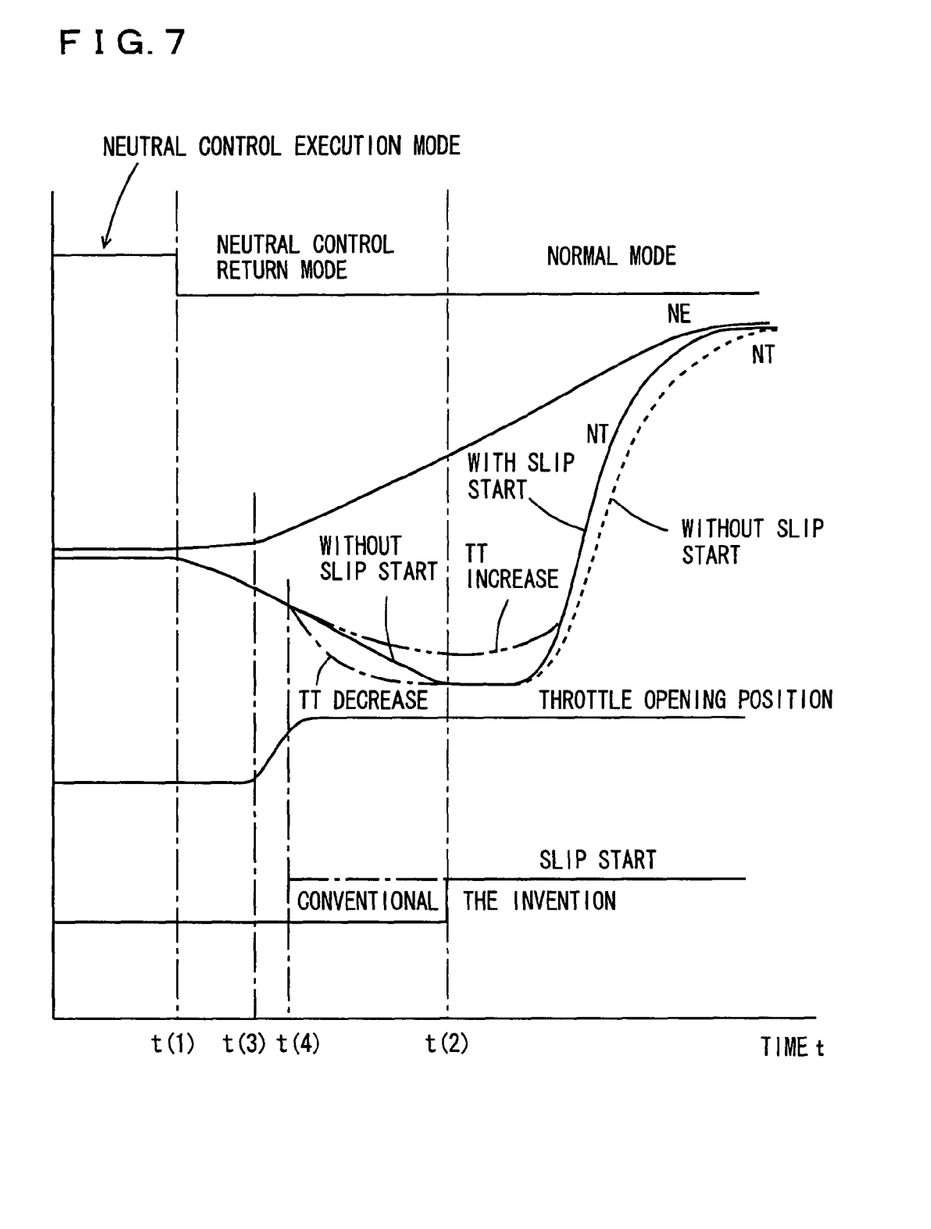
FIG. 7 shows a timing chart (3) of respective levels of states in the case of execution by the ECU that is the control device according to the first embodiment of the present invention.

As to an operation, based on the above-described structure and flowchart, of the vehicle controlled by ECU 8000 which is the control device for the automatic transmission of the present embodiment, a description is given with reference to the timing charts shown in FIGS. 5 to 7.

FIG. 5 shows changes with time of engine rotational speed NE, turbine rotational speed NT and the engaging pressure (command pressure) of C1 clutch 3640, when the mode changes from the neutral control execution mode to the neutral control return mode and then to a normal mode. FIG. 5 shows the case where the accelerator pedal is not depressed (namely engine rotational speed NE does not change). At time t (1), a brake signal is made OFF (YES in S200) and the neutral control return mode is started to cause the engaging pressure (command pressure) of C1 clutch 3640 to temporarily increase to an initial engaging pressure. After this, a constant standby pressure is kept and thereafter the pressure is increased with a constant gradient. At time t (2), the engagement of C1 clutch 3640 is completed and the mode changes from the neutral control return mode to the normal mode. At this time, in the period of the neutral control return mode, as C1 clutch 3640 engages, turbine rotational speed NT decreases while the state of torque converter 3200 changes from the state where the torque converter transmits torque to the state where the torque converter slips without transmitting the torque.

FIG. 6 shows the state (without slip start) where the accelerator pedal is depressed to open the throttle in the neutral control return mode shown in FIG. 5. For example, this is the state where a driver depresses the accelerator pedal at time t (3) immediately after the driver releases the brake pedal at time t (1). From time t (3), engine rotational speed NE increases. At time t (2), engagement of C1 clutch 3640 is completed. In the period of the neutral control return mode, turbine rotational speed NT decreases similarly to the decrease shown in FIG. 5. At time t (2) and thereafter, engine torque TE is transmitted via torque converter 3200 to the transmission mechanism (1st gear is implemented) and then transmitted at a desired gear ratio to front wheels that are drive wheels. Thus, the vehicle is started.

FIG. 7 shows the state where the accelerator pedal is depressed to open the throttle in the neutral control return mode as shown in FIG. 5 and shows respective cases where the slip start is made and the slip start is not made. When the mode is now the neutral control return mode (YES in S200) and the accelerator is made ON (YES in S300), the proceeding state of the neutral control return mode is detected (S400). When it is determined that the neutral control return mode is now in the initial state (YES in S500), the slip start is inhibited (S600) and turbine rotational speed NT changes as indicated by the solid line. It is supposed here that the initial state of the neutral control return mode continues to time t (2) (the initial state may continue to any time somewhat earlier than time t (2)). At time t (2), it is determined that the neutral control return mode is not in the initial state (NO in S500), and the slip start is permitted (S700). Accordingly, as compared with the case where the slip start is not made (NT indicated by the dotted line after time t (2)), turbine rotational speed NT (NT indicated by the solid line after time t (2)) increases earlier so that the start performance is improved.

In contrast, if the slip start is carried out even in the initial state of the neutral control return mode (the slip start is initiated at time t (4)) as conventionally done, C1 clutch 3640 is suddenly engaged to generate shock in the case where turbine torque TT decreases (NT indicated by the dashed line after time (4)). In the case where turbine torque TT increases, C1 clutch 3640 slips without sufficiently transmitting the torque, resulting in deterioration in wear resistance (NT of the double-dashed line after time t (4)).

As seen from the above, with the ECU which is the control device for the automatic transmission of the present embodiment, in the case where the mode returns from the neutral control and the forward clutch is not sufficiently engaged, the slip start is inhibited. Thus, when the control returns from the neutral control, the durability of the forward clutch can be kept while the engagement shock can be prevented from occurring.

Second Embodiment

In the following, a second embodiment of the present invention is described. Control blocks for example of the present-embodiment are identical to those of the first embodiment. Therefore, the detailed description thereof is not repeated here. In the present embodiment, a program that is partially different from that of the first embodiment is executed.

Figure 8:
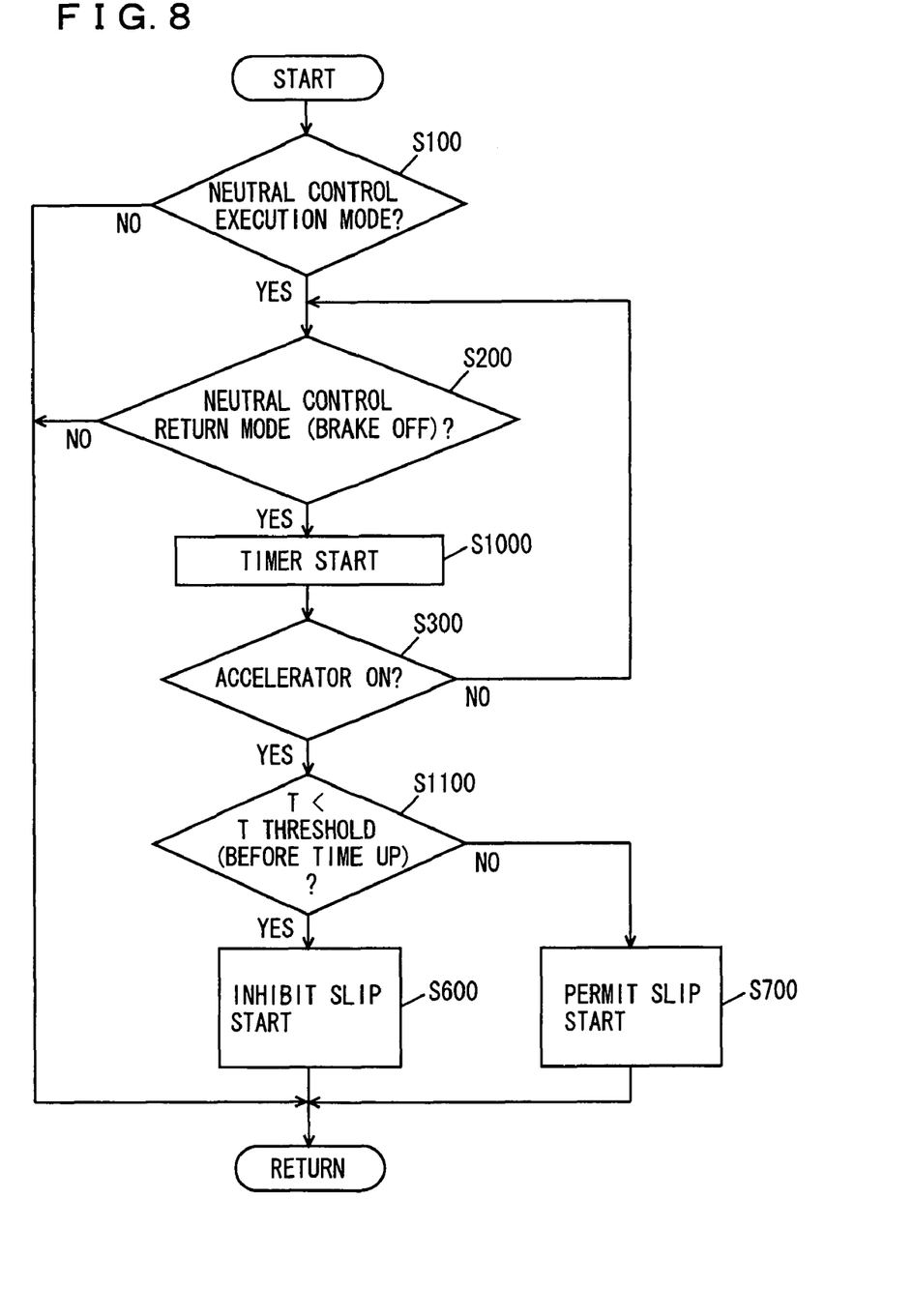
FIG. 8 is a flowchart showing a control structure of a program executed by the ECU that is the control device according to a second embodiment of the present invention.

Referring to FIG. 8, a description is given of a control structure of a program executed by ECU 8000 that is the control device of the present embodiment. The same process steps as those of the flowchart shown in FIG. 4 are indicated by the same step numbers. Details of these process steps are also identical. Therefore, a detailed description thereof is not repeated here.

In S1000, ECU 8000 starts a timer (timer set value is T threshold here). In S1100, ECU 8000 determines whether or not count time T of the timer is smaller than T threshold. When count time T of the timer is smaller than T threshold, namely there is no time-up, the process proceeds to S600. Otherwise (NO in S1100), the process proceeds to S700.

In this way, the timer monitors the period from the time of the neutral control return to the time when the hydraulic pressure is applied for engaging the forward clutch to allow the forward clutch to be engaged. When a predetermined time passes from the start of the return from the neutral control, it is determined that the initial state has ended, and thus the slip start can be permitted. Otherwise, the slip start is inhibited to suppress the engagement shock of the forward clutch and improve the durability of the forward clutch.

Third Embodiment

In the following, a third embodiment of the present invention is described. Control blocks for example of the present embodiment are identical to those of the first embodiment. Therefore, the detailed description thereof is not repeated here. In the present embodiment, a program that is partially different from that of the first embodiment is executed.

Figure 9:
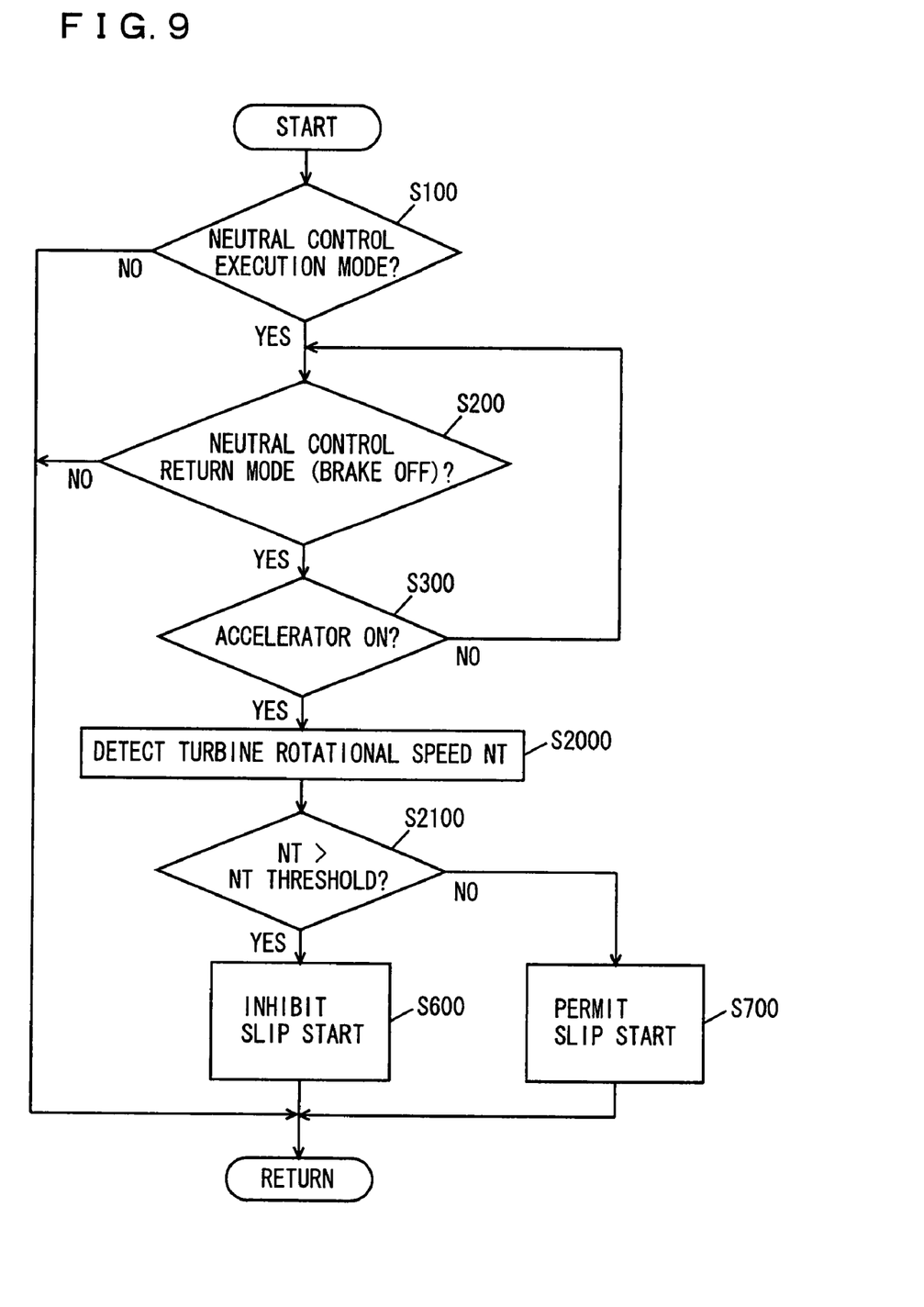
FIG. 9 is a flowchart showing a control structure of a program executed by the ECU that is the control device according to a third embodiment of the present invention.

Referring to FIG. 9, a description is given of a control structure of a program executed by ECU 8000 that is a control device of the present embodiment. The same process steps as those of the flowchart shown in FIG. 4 are indicated by the same step numbers. Details of these process steps are also identical. Therefore, a detailed description thereof is not repeated here.

In S2000, ECU 8000 detects turbine rotational speed NT. In S2100, ECU 8000 determines whether or not turbine rotational speed NT is larger than NT threshold. When turbine rotational speed NT is still larger than NT threshold (YES in S2100), the process proceeds to S600. Otherwise (NO in S2100), the process proceeds to S700.

As seen from the above, in returning from the neutral control to engage the forward clutch, turbine rotational speed NR decreases. Therefore, after starting the return from the neutral control, change of turbine rotational speed NT is detected. When turbine rotational speed NT becomes equal to or smaller than NT threshold, it is determined that the initial state is ended, and thus the slip start can be permitted. Otherwise, the slip start is inhibited to suppress engagement shock of the forward clutch and improve the durability of the forward clutch.

It should be understood that the embodiments herein disclosed are by way of illustration in every respects, not by way of limitation. It is intended that the scope of the present invention is defined by claims, not by the description above, and includes all modifications equivalent in meaning and scope to the claims.

The invention claimed is:

1. A control device for an automatic transmission that includes an engagement element engaged when a vehicle is started, said automatic transmission including a torque converter that includes a lockup clutch and a transmission mechanism, said control device comprising:

a neutral control execution unit that controls said transmission mechanism to disengage said engagement element when said vehicle is in a forward travel position, satisfies a first predetermined condition, and accordingly stops;

a neutral control return unit that controls said transmission mechanism to engage said engagement element when said vehicle satisfies a second predetermined condition;

a start control unit that controls said lockup clutch to set said lockup clutch in a slip state when return is made from said neutral control, said engagement element is engaged, and said vehicle is started;

a detection unit that detects a state of return from said neutral control; and a determination unit that determines, based on the state of return from said neutral control, whether to control said lockup clutch by said start control unit, wherein said determination unit determines to inhibit the control by said start control unit when the return from said neutral control is in an initial state.

2. The control device for the automatic transmission according to claim 1, wherein said determination unit determines to execute the control by said start control unit when the return from said neutral control has passed through the initial state.

3. The control device for the automatic transmission according to claim 1, wherein said determination unit determines that, when a predetermined time passes from start of the return from said neutral control, the return from said neutral control has passed through said initial state, and determines to execute control by said start control unit.

4. The control device for the automatic transmission according to claim 1, wherein said determination unit determines that, when a turbine rotational speed is at most a predetermined rotational speed, said initial state has been passed through, and determines to execute control by said start control unit.

5. A control device for an automatic transmission that includes an engagement element engaged when a vehicle is started, said automatic transmission including a torque converter that includes a lockup clutch and a transmission mechanism, said control device comprising:

neutral control execution means for controlling said transmission mechanism to disengage said engagement element when said vehicle is in a forward travel position, satisfies a first predetermined condition, and accordingly stops;

neutral control return means for controlling said transmission mechanism to engage said engagement element when said vehicle satisfies a second predetermined condition;

start control means for controlling said lockup clutch to set said lockup clutch in a slip state when return is made from said neutral control, said engagement element is engaged, and said vehicle is started;

detection means for detecting a state of return from said neutral control; and determination means for determining, based on the state of return from said neutral control, whether to control said lockup clutch by said start control means, wherein said determination means includes means for determining to inhibit the control by said start control means when the return from said neutral control is in an initial state.

6. The control device for the automatic transmission according to claim 5, wherein said determination means includes means for determining to execute the control by said start control means when the return from said neutral control has passed through an initial state.

7. The control device for the automatic transmission according to claim 5, wherein said determination means includes means for determining that, when a predetermined time passes from start of the return from said neutral control, the return from said neutral control has passed through said initial state, and determining to execute control by said start control means.

8. The control device for the automatic transmission according to claim 5, wherein said determination means includes means for determining that, when a turbine rotational speed is at most a predetermined rotational speed, said initial state has been passed through, and determining to execute control by said start control means.

9. The control device for the automatic transmission according to claim 1, wherein the neutral control is in the initial state when the engagement element is less than completely engaged.

10. The control device for the automatic transmission according to claim 1, wherein the neutral control is in the initial state when a return time, that begins when the return from the neutral control begins, is less than a predetermined time.

11. The control device for the automatic transmission according to claim 1, wherein the neutral control is in the initial state when a turbine rotational speed of the torque converter is equal or lesser than a predetermined threshold.

12. The control device for the automatic transmission according to claim 5, wherein the neutral control is in the initial state when the engagement element is less than completely engaged.

13. The control device for the automatic transmission according to claim 5, wherein the neutral control is in the initial state when a return time, that begins when the return from the neutral control begins, is less than a predetermined time.

14. The control device for the automatic transmission according to claim 5, wherein the neutral control is in the initial state when a turbine rotational speed of the torque converter is equal or less than a predetermined threshold.

* * * * *